Patented Jan. 14, 1947

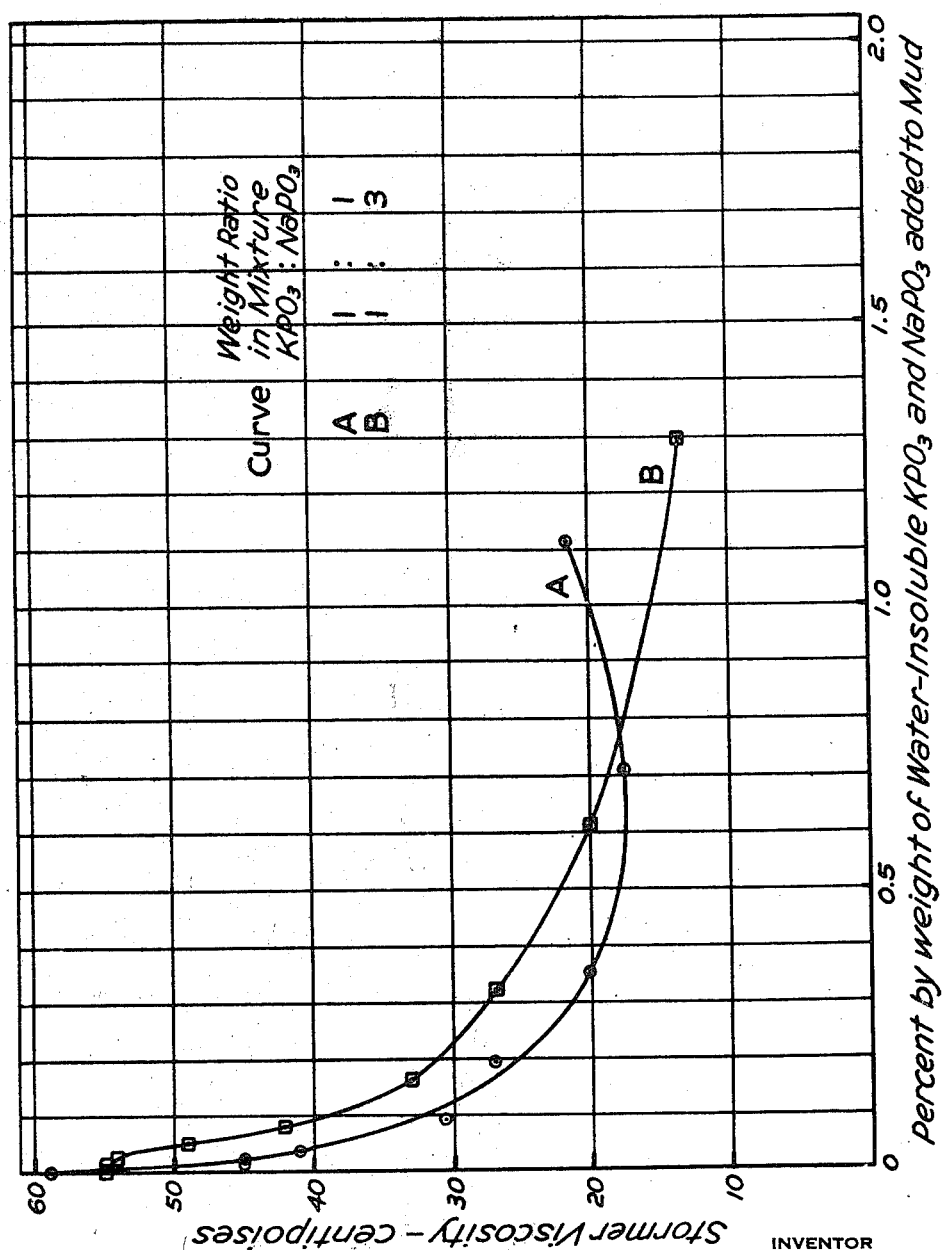

2,414,381

UNITED STATES PATENT OFFICE 2,414,381

WELL DRILLING MUD AND PROCESS

Norman E. Martello, Turtle Creek, Pa., assignor to Hall Laboratories, Inc., Pittsburgh, Pa., a corporation of Pennsylvania Application February 18, 1944, Serial No. 522,955

6 Claims. (Cl. 252—8.5)

This invention relates to well drilling mud and to a process of controlling the viscosity of well drilling mud.

In drilling oil wells, for example, it is customary to employ a mud or fluid which serves various purposes which are well known. The drilling mud is circulated from a sump above the ground down through the drill pipe, around the drilling tool where it picks up the chips formed by the drill, and then up the bore to screens where the chips are removed. The mud passes to a sump in which sand settles and the mud is again circulated through the bore. The mud also serves to lubricate the drill pipe, to seal the wall of the bore, and to provide a hydrostatic head which prevents the well from blowing out, in case high formation pressures are encountered.

In order to increase the weight of the drilling mud, it has been customary in the past to add weighting material, such, for example, as barite or hematite. While these or other materials are satisfactory from the standpoint of increasing the weight of the mud, they increase the viscosity of the mud, so that it becomes more difficult to pump. If it is attempted to increase the weight of the mud by increasing the proportion of clay to water either with or without the addition of weighting agents, the viscosity likewise is increased too much.

Various materials have been added to muds in order to control their viscosity. One class of material which has been used for this purpose is the rapidly soluble sodium phosphate glass of the type of Graham's salt. While this rapidly reduces the viscosity of the mud, it tends to revert to the ineffective orthophosphate when subjected to the high temperatures in the well. In an attempt to stabilize the viscosity of the mud more effectively, it has been suggested to add to the mud materials such, for example, as water-insoluble crystalline sodium metaphosphate or water-insoluble crystalline potassium metaphosphate which react slowly in the mud to reduce its viscosity. Where the water-insoluble sodium metaphosphate alone is added as solid particles to the mud, it is found that its action in dispersing or deflocculating the mud is not as rapid as is desired in certain instances, for example, where the metaphosphate is added just ahead of the screens over which the mud passes prior to passing to the sump. Water-insoluble potassium metaphosphate is particularly effective as a deflocculant and acts more rapidly than water-insoluble sodium metaphosphate when added directly as solid particles to the mud, but I have found it to have the disadvantage of causing a transient initial increase in the viscosity of the mud before the ultimate desired decrease in viscosity. The deflocculating effect of the water-insoluble potassium metaphosphate upon the mud is not as prolonged as that of the water-insoluble sodium metaphosphate.

After I had worked with these materials for several years it suddenly occurred to me that a mixture of the two water-insoluble alkali-metal metaphosphates might produce more desirable results than either one by itself. I accordingly tested a mechanical mixture of equal parts by weight of finely divided water-insoluble sodium and potassium metaphosphates and found that the tendency of the potassium metaphosphate to cause temporary initial gelling was considerably decreased, and the desired reduction in viscosity was not only rapidly produced, but the mud remained stabilized at the desired level of viscosity as satisfactorily as with the slow-acting sodium metaphosphate alone.

On working with other mixtures, I discovered that results superior to those obtainable with either substance alone and nearly as good as those resulting from the mixture of equal parts by weight could be obtained when the ratio of water-insoluble $KPO_3$ to water-insoluble $NaPO_3$ was between about 2:1 and 1:5 by weight. Decrease in the relative amount of $KPO_3$ decreased the transient initial gelling effect and conferred increased stability on the mud, but tended to delay attainment of minimum viscosity.

In attempting to overcome the transient gelling effect of the water-insoluble potassium metaphosphate, I have found that if a slurry or viscous suspension or mass of a mixture of water-insoluble sodium metaphosphate and water-insoluble potassium metaphosphate is formed by mixing with water and such suspension is added to drilling mud, the viscosity of the drilling mud is reduced without causing an initial increase in the viscosity of the mud. Furthermore, the mud so treated is stabilized over a long period of time.

The proportions of water-insoluble potassium metaphosphate and water-insoluble sodium metaphosphate in the mixture which is to be formed into a slurry or viscous mass may vary over quite wide ranges. The preferred proportions of the potassium metaphosphate to sodium metaphosphate are about 1:1 by weight, but good results can be obtained where the ratio of potassium metaphosphate to sodium metaphosphate is from about 2:1 to 1:5. Under certain conditions these ratios may be broadened.

Preferably the powders of water-insoluble potassium metaphosphate and water-insoluble sodium metaphosphate are added to water and mixed by stirring for 10 to 15 minutes while heated, say to a temperature of about 60 to 80° C. A convenient means of heating is provided by a steam hose discharging beneath the surface of the water in the mixing barrel or tank. The time of mixing and the temperature employed are not critical but are given merely by way of example. The slurries or suspensions of the mixture of materials may vary quite widely in concentration. I prefer to use suspensions in which the water-insoluble sodium metaphosphate and water-insoluble potassium metaphosphate when taken together constitute about 5 to 30% by weight, although even thinner or heavier suspensions may be employed. While the particle size of the powders is not in any way critical, I have used water-insoluble sodium metaphosphate and water-insoluble potassium metaphosphate having a maximum particle size as large as about 100 meshes per linear inch and as small as about 400 meshes per linear inch.

In some cases it may be convenient to employ a dry mixture in which the water-insoluble sodium and potassium metaphosphates are mixed with clay, bentonite, with weighting agents such as barite, or with any or all of the permanently solid components of a drilling mud, prior to the introduction of the mixture of materials into the drilling mud. In this manner, solid material which would normally increase the viscosity when added to the drilling mud may have this undesirable characteristic balanced to any desired degree by admixture of the proper amounts of the water-insoluble and non-hygroscopic sodium and potassium metaphosphates. The mixtures of permanently solid components and water-insoluble metaphosphates may be fed dry to the circulating mud or may be first mixed with water.

One particular advantage of my invention is the freedom from danger of ruining the properties of the mud in case of accidental overtreatment. Addition of amounts of water-insoluble $KPO_3$ and $NaPO_3$ in excess of those required to reduce the viscosity of a mud do not cause the mud to thicken or clabber as is the case with other chemicals which have been employed. The broad range of treatment within which good results may be obtained is indicated in Figure 1, representing data obtained in laboratory tests on a previously untreated mud made up to a density of 76.25 pounds per cubic foot from equal parts by weight of McKittrick light rotary clay and Rogers Lake clay.

The procedure used in the tests was as follows: Mud samples were weighed out into bottles, treated with chemical, shaken by hand 30 times and placed in an electric oven set at 164° F. for 30 minutes, during which time the samples attained a temperature of 160–164° F. The samples were then removed from the oven and allowed to cool to room temperature during 60 minutes. They were then shaken by hand 50 times and the viscosity determined immediately at 77° F. by means of a Stormer viscosimeter at a speed of 600 R. P. M.

In Figure 1, curves A and B represent the effect on the viscosity of the mud of various increments of two mixtures of water-insoluble $KPO_3$ and $NaPO_3$. In the case of curve A, the weight ratio of $KPO_3$ to $NaPO_3$ was 1:1, in the case of curve B 1:3. In each case it is evident that relatively small additions in the range from 0.1 to 0.4 per cent on the weight of the mud markedly reduce the viscosity and that excesses up to 1.3 per cent or even higher will still yield excellent results without damage to the mud.

The efficacy of mixtures of water-insoluble $KPO_3$ and water-insoluble $NaPO_3$ has been demonstrated in full-scale field tests during drilling at a depth of from 6,500 to 10,000 feet. The viscosity of the mud, which had a density of about 76 pounds per cubic foot, was determined by means of a Marsh funnel in terms of the seconds required for 1000 ml. of mud to flow from the funnel when 1500 ml. was added to it. The first mixture used for treating was a viscous aqueous suspension containing 5 per cent by weight of water-insoluble $KPO_3$ and 5 per cent by weight of water-insoluble $NaPO_3$. A total of 313 pounds of solid chemical was added to an estimated 3,120 cubic feet of newly prepared and previously untreated mud during a period of about 3.5 hours. This addition corresponded to about 0.13 per cent on the weight of the mud. While the initial viscosity of the mud prior to treatment was very spotty, varying from a high of 208 to a low of 73 seconds, the viscosity after addition of the treating mixture was low and nearly uniform, varying from 48 to 56 seconds.

Similar results were likewise obtained on fresh untreated mud by adding, during a period of 2 hours, 307 pounds of a mixture of 1 part of water-insoluble $KPO_3$ and 3 parts of water-insoluble $NaPO_3$, in the form of a viscous aqueous suspension containing 10 per cent of solids, to an estimated 3,072 cubic feet of mud with a density of 75.5 pounds per cubic foot. In this case the mud prior to treatment showed Marsh viscosities of from 64 to 91 seconds; during the period of three hours after treatment, the highest viscosity observed was 67 and the lowest 52, while a day later, without any further chemical treatment, the viscosities ranged from 43 to 54.

During drilling operations the changes in viscosity incident to addition of clay, bentonite, or weighting agent, or to contamination by cement or salt or to loss of water to the formation or by evaporation may be controlled not only by adding water-insluble $KPO_3$ and water-insoluble $NaPO_3$ mixed prior to their introduction into the mud, but also, if desired, by the successive addition of the $KPO_3$ and $NaPO_3$, either dry or in aqueous suspension. The relative amounts of $KPO_3$ and $NaPO_3$ in the mud may thus be adjusted by feeding either one alone for a time. Where quick response of the mud is desired and the transient gelling effect is not objectionable, water-insoluble $KPO_3$ might be fed for a time, then followed by water-insoluble $NaPO_3$ to give prolonged stability.

The invention is not limited to the preferred proportions or materials but may be otherwise embodied or practiced within the scope of the following claims.

I claim:

1. The process of controlling the viscosity of aqueous well drilling mud, which comprises adding thereto a mixture containing water-insoluble potassium metaphosphate and water-insoluble sodium metaphosphate in the proportions by weight from about 2:1 to 1:5 of the potassium metaphosphate to the sodium metaphosphate.

2. The process of controlling the viscosity of aqueous well drilling mud, which comprises adding thereto a mixture containing about equal proportions by weight of water-insoluble potassium metaphosphate and water-insoluble sodium metaphosphate.

3. The process of controlling the viscosity of aqueous well drilling mud, which comprises forming an aqueous mixture containing about equal proportions by weight of water-insoluble potassium metaphosphate and water-insoluble sodium metaphosphate and adding the aqueous mixture to the mud.

4. The process of controlling the viscosity of aqueous well drilling mud, which comprises forming an aqueous mixture containing water-insoluble potassium metaphosphate and water-insoluble sodium metaphosphate in the proportions by weight from about 2:1 to 1:5 of the potassium metaphosphate to sodium metaphosphate, and adding the aqueous mixture to the mud.

5. Well-drilling mud comprising an aqueous dispersion of at least one mud-forming solid, water-insoluble potassium metaphosphate and water-insoluble sodium metaphosphate, the proportion of the potassium metaphosphate to the sodium metaphosphate being from about 2:1 to 1:5 by weight.

6. As a new composition of matter, a mixture comprising at least one permanently solid component of drilling mud, water-insoluble potassium metaphosphate and water-insoluble sodium metaphosphate, the proportion of the potassium metaphosphate to the sodium metaphosphate being from about 2:1 to 1:5 by weight.

NORMAN E. MARTELLO.